(12) United States Patent
Schottland et al.

(10) Patent No.: US 6,716,368 B1
(45) Date of Patent: Apr. 6, 2004

(54) PHOSPORESCENT POLYCARBONATE AND MOLDED ARTICLES

(75) Inventors: Philippe Schottland, Evansville, IN (US); Michael W. Brown, Mt. Vernon, IN (US); Steven R. Peak, Evansville, IN (US)

(73) Assignee: General Electric Company, Pittsfield, MA (US)

( * ) Notice: Subject to any disclaimer, the term of this patent is extended or adjusted under 35 U.S.C. 154(b) by 387 days.

(21) Appl. No.: 09/922,624

(22) Filed: Aug. 6, 2001

(51) Int. Cl.[7] .................. C09K 11/02; C09K 11/08; C09K 3/10; C09K 3/22; C08G 63/00
(52) U.S. Cl. ................... 252/301.36; 252/301.4 R; 252/301.33; 252/301.35; 524/436; 524/403; 524/437; 524/432; 524/435; 528/196; 528/198; 528/200
(58) Field of Search .............. 252/301.36, 301.4 R, 252/301.33, 301.35; 528/196, 198, 200; 524/403, 436, 437, 432, 435

(56) References Cited

U.S. PATENT DOCUMENTS

| | | | | |
|---|---|---|---|---|
| 5,424,006 A | * | 6/1995 | Murayama et al. ... | 252/301.4 R |
| 5,530,083 A | * | 6/1996 | Phelps et al. .................. | 528/25 |
| 5,607,621 A | * | 3/1997 | Ishihara et al. ......... | 252/301.36 |
| 5,655,826 A | * | 8/1997 | Kouno et al. ................. | 362/24 |
| 5,674,437 A | * | 10/1997 | Geisel .......................... | 264/21 |
| 5,698,301 A | * | 12/1997 | Yonetani .................... | 428/213 |
| 5,811,174 A | * | 9/1998 | Murakami ............... | 428/195.1 |
| 5,976,411 A | * | 11/1999 | Feng et al. ............ | 252/301.35 |
| 6,253,698 B1 | * | 7/2001 | Goedel ........................ | 114/218 |
| 6,359,381 B1 | * | 3/2002 | Okuno et al. ................ | 313/485 |
| 6,375,864 B1 | * | 4/2002 | Phillips et al. ......... | 252/301.33 |
| 6,431,236 B1 | * | 8/2002 | Kanenari et al. ........... | 152/450 |

FOREIGN PATENT DOCUMENTS

JP      A-12-034 414      *   2/2000

\* cited by examiner

Primary Examiner—Joseph D. Anthony

(57) ABSTRACT

The present invention is drawn to a transparent or translucent thermoplastic composition comprising a thermoplastic polycarbonate resin and a phosphorescent phosphor with an aluminate matrix expressed by $MAl_2O_4$ in which M is calcium, strontium or barium. Said phosphorescent phosphor is present in a quantity of 0.01 to 2.0% by weight with respect to the quantity of polycarbonate resin and possesses a median particle size of less than 10 micrometer. Forming an object by injection molding using said transparent or translucent thermoplastic composition is also disclosed.

9 Claims, No Drawings

PHOSPORESCENT POLYCARBONATE AND MOLDED ARTICLES

BACKGROUND OF THE INVENTION

The invention relates to transparent or translucent thermoplastic compositions comprising a thermoplastic polycarbonate resin and a phosphorescent compound with an aluminate matrix expressed by $MAl_2O_4$ in which M is at least one metal element selected from calcium, strontium and barium. The thermoplastic compositions can comprise besides the polycarbonate resin other polymers. The compositions of the invention are particularly suitable for injection molding processes. The invention also relates to objects obtained by injection molding of the compositions according to the invention.

Phosphorescent compounds with an aluminate matrix are well known. U.S. Pat. No. 5,424,006 describes this type of phosphors and refers to the possibility to mix them into a plastic material. The particle size of the described phosphors is such that they pass a sieve mesh 100 i.e. that they have a particle size below about 150 micrometer.

U.S. Pat. No. 5,607,621 describes phosphorescent synthetic resin materials comprising about 5 to about 20% by weight of similar aluminate based phosphors and a synthetic resin. Many synthetic resins are mentioned by way of example. The particle size of the pigment for the compositions of U.S. Pat. No. 5,607,621 is chosen as follows: synthetic resin compositions for injection molding should have a phosphorescent pigment with an average particle size of 15 to 25 micrometer, synthetic resin compositions suitable for extrusion molding should comprise a phosphorescent compound with an average particle size of 10 to 20 micrometer. The phosphorescent compound in compositions for monofilament extrusion molding should have an average particle size of 1 to 10 micrometer.

U.S. Pat. No. 5,976,411 describes molded, extruded or formed phosphorescent plastic articles made out of a plastic composition comprising a thermoplastic or a thermosetting resin, about 1% to about 50% by weight of a phosphorescent phosphor pigment and about 0.001% to about 20% by weight of a laser energy absorbing additive. Polycarbonate has been mentioned as one of the many suitable resins. U.S. Pat. No. 5,976,411 describes aluminate based phosphors with various particle sizes such as a particle size of "20±5 micrometer to greater than 100 micrometer" or particles that pass through a mesh 200 sieve, which approximately corresponds to a size of below 75 micrometer. U.S. Pat. No. 5,976,411 gives an example of a composition comprising polycarbonate and 5% by weight of a phosphor with unknown particle size.

JP-A-12-034 414 describes semitransparent light-storing resins which contain in total 1–4% by weight of a light storing pigment. The content of light-storing pigment particles with a size of 20 micrometer or higher should be in the range of 1–4% by weight and the content of light storing pigment particles with a size of lower than 20 micrometer should be in the range of 1% by weight or lower. Strontium aluminates are used in the examples of this Japanese patent application. According to JP-A-12-034 414 it was common to use pigments with a very wide range of particle sizes varying from several tens micrometers to hundreds of micrometers and an average particle size of about 10–20 micrometer. JP-A-12-034 414 seeks to improve the balance of relative density of residual luminescence and the light transmission of the known compositions by using pigments with above described particle size. Upon incorporation of the pigments of JP2000-34414 in a polycarbonate resin the favorable physical properties of the polycarbonate get lost. The aluminate particles are very bard and cause wear of the screws in injection molding machinery. The wear is so strong that graying of the composition processed with the screw may result.

SUMMARY OF THE INVENTION

It has now be found that upon incorporating phosphorescent pigments of a specific particle size in polycarbonates it is possible to combine the phosphorescent properties while maintaining the favorable physical properties of the polycarbonate. It has also become possible to obtain less graying of the composition of the invention when processed with the screws of injection molding machines. The invention deals with transparent or translucent thermoplastic compositions comprising a thermoplastic polycarbonate resin and a phosphorescent compound with an aluminate matrix expressed by $MAl_2O_4$ in which M is at least one metal element selected from calcium, strontium and barium, wherein the phosphor is present in a quantity of 0.1 to 2.0% by weight with respect to the quantity of polycarbonate resin and possesses a median particle size of less than 10 micrometer. The more preferred quantity of the phosphor is 0.1 to 1.0% by weight.

In a more preferred embodiment of the invention, the phosphor has a median particle size of below 5.0 micrometer and a maximum particle diameter of 10 micrometer.

It is possible to use aluminate phosphors which have been doped with Europium.

It is also possible to use aluminate phosphors which have been doped with Europium and at least one co-dopant like Dysprosium.

Objects formed by injection molding of the transparent or translucent thermoplastic composition of any of the compositions of the invention also form part of the invention.

DETAILED DESCRIPTION OF THE INVENTION

The transparent or translucent compositions of the invention should comprise at least:

A. a thermoplastic polycarbonate and

B a phosphorescent phosphor with an aluminate matrix as defined in the claims.

The compositions of the invention may further comprise one or more other polymers, agents to improve the impact strength, usual additives to the extent that they do not interfere with the desired optical and aesthetic effects obtained by the incorporation of the phosphorescent pigment.

Polycarbonates.

As used herein, the term "polycarbonate " includes polymers having structural units of the formula (I):

(I)

in which at least about 60 percent of the total number of $R^1$ groups are aromatic organic radicals and the balance thereof are aliphatic, alicyclic, or aromatic radicals. Preferably, $R^1$ is an aromatic organic radical and, more preferably, a radical of the formula (II):

(II)

wherein each of $A^1$ and $A^2$ is a monocyclic divalent aryl radical and $Y^1$ is a bridging radical having zero, one, or two atoms which separate $A^1$ from $A^2$. In an exemplary embodiment, one atom separates $A^1$ from $A^2$. Illustrative, non-limiting examples of radicals of this type are —O—, —S—, —S(O)—, —S(O$_2$)—, —C(O)—, methylene, cyclohexylmethylene, 2-[2,2,1]-bicycloheptylidene, ethylidene, isopropylidene, neopentylidene, cyclohexylidene, cyclopentadecylidene, cyclododecylidene, adamantylidene, and the like. In another embodiment, zero atoms separate $A^1$ from $A^2$, with an illustrative example being biphenol (OH-benzene-benzene-OH). The bridging radical $Y^1$ can be a hydrocarbon group or a saturated hydrocarbon group such as methylene, cyclohexylidene or isopropylidene.

Polycarbonates can be produced by the reaction of dihydroxy compounds in which only one atom separates $A^1$ and $A^2$. As used herein, the term "dihydroxy compound" includes, for example, bisphenol compounds having general formula (III) as follows:

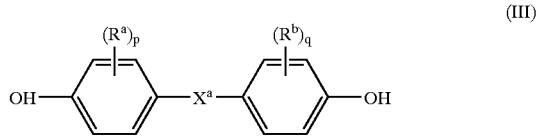

(III)

wherein $R^a$ and $R^b$ each independently represent hydrogen, a halogen atom, or a monovalent hydrocarbon group; p and q are each independently integers from 0 to 4; and $X^a$ represents one of the groups of formula (IV):

(IV)

wherein $R^c$ and $R^d$ each independently represent a hydrogen atom or a monovalent linear or cyclic hydrocarbon group, and $R^e$ is a divalent hydrocarbon group.

Some illustrative, non-limiting examples of suitable dihydroxy compounds include dihydric phenols and the dihydroxy-substituted aromatic hydrocarbons such as those disclosed by name or formula (generic or specific) in U.S. Pat. No. 4,217,438,. A nonexclusive list of specific examples of the types of bisphenol compounds that may be represented by formula (III) includes the following: 1,1-bis(4-hydroxyphenyl) methane; 1,1-bis(4-hydroxyphenyl) ethane; 2,2-bis(4-hydroxyphenyl) propane (hereinafter "bisphenol A" or "BPA"); 2,2-bis(4-hydroxyphenyl) butane; 2,2-bis(4-hydroxyphenyl) octane; 1,1-bis(4-hydroxyphenyl) propane; 1,1-bis(4-hydroxyphenyl) n-butane; bis(4-hydroxyphenyl) phenylmethane; 2,2-bis(4-hydroxy-1-methylphenyl) propane; 1,1-bis(4-hydroxy-t-butylphenyl) propane; bis(hydroxyaryl) alkanes such as 2,2-bis(4-hydroxy-3-bromophenyl) propane; 1,1-bis(4-hydroxyphenyl) cyclopentane; 4,4'-biphenol ;and bis(hydroxyaryl) cycloalkanes such as 1,1-bis(4-hydroxyphenyl) cyclohexane; and the like as well as combinations comprising at least one of the foregoing bisphenol compound.

It is also possible to employ polycarbonates resulting from the polymerization of two or more different dihydric phenols or a copolymer of a dihydric phenol with a glycol or with a hydroxy- or acid-terminated polyester or with a dibasic acid or with a hydroxy acid or with an aliphatic diacid in the event a carbonate copolymer rather than a homopolymer is desired for use. Generally, useful aliphatic diacids have about 2 to about 40 carbons. A preferred aliphatic diacid is dodecandioic acid.

Phosphorescent Phosphor with an Aluminate Matrix and Aesthetic Effects Obtained by the Phosphors.

The articles molded out of the compositions of the invention are phosphorescent. Fluorescence and phosphorescence are very similar phenomena on a molecular scale. They occur when a substance absorbs radiation of a certain wavelength and re-emits photons of different wavelength. Typically, the emission of phosphorescence takes place in more than $10^{-4}$ seconds (and may last for minutes or hours) while fluorescence is an extremely brief phenomenon lasting between $10^{-4}$ and $10^{-9}$ seconds. When a phosphorescent or fluorescent molecule absorbs light, electrons are excited to a higher vibrational energy state. The molecule then loses its excess of vibrational energy by collisions and internal energy conversions and falls to the lowest vibrational level of the first excited state. From this level, the molecule can return to any of the vibrational levels of the ground state, emitting its energy in the form of fluorescence.

Long afterglow phosphorescent pigments typically absorb light between 200 and 450 nm. As a result, the light source having the most important UV contribution will be the most efficient to activate the phosphorescent formulations. Illuminant D65 (6500K light source) is an excellent reproduction of daylight including the UV range.

After ten minutes of D65 illumination in a MacBeth light booth, the color chips molded from the thermoplastic resin composition of the invention exhibit a strong initial glow that decreases exponentially over several hours. It is noteworthy that the emission is noticeably stronger on the edge of the chip because the polycarbonate acts as a wave-guide thus creating an "edge glow" effect. After one hour, the light emission from the face of the color chip is still up to 4000 times the visible threshold for the human eye (0.003 mCd/m$^2$). The edge glow effect adds an interesting potential in terms of design because it allows for example the realization of accent features in molded parts. The amount of edge glow effect can be reduced by addition of a light scattering agent which is typically—but not limited to—titanium dioxide, zinc oxide, or teflon. The scattering agent will not only make the part glow more homogeneously at night, but also give more possibilities in terms of colorability. Bright colors (like blue, yellow, green, violet, light red and orange) have been obtained and, despite the presence of colorants, exhibit a glow performance similar or better than formulations not containing the scattering agent.

It must be noted that some phosphorescent pigments can be efficiently activated by a light source without UV energy. These phosphors arc indeed quickly activated by indoor light like cool white fluorescent light. They are a preferred embodiment when used in combination with light scattering agents like titanium dioxide and other colorants. Another important application of these special phosphors is in formulations containing UV stabilizers because the stabilizer screens the UV energy and therefore does not allow usual phosphors to be quickly and efficiently activated.

The chemical structure of suitable phosphorescent pigments with an aluminate matrix have been described in the above mentioned patents, in particular in U.S. Pat. No. 5,424,006. It is preferred to use phosphorescent phosphors which have been doped with Europium and even more preferably with Europium and at least one co-dopant.

They are commercially available in different particles sizes from Nemoto & Co.

The phosphorescent phosphors as used in the thermoplastic compositions of this invention should have a median particle size of less than ten (10) micrometer. The median particle size is sometimes indicated as D50-value. It can be measured with a commonly known laser diffraction method, more accurately called low angle light scattering (LALLS). A general description of this method can be found for example in ISO 13320, a new international standard relating to particle size analysis by laser diffraction.

Other Components of the Compositions of the Invention.

The compositions of the invention may comprise further additives like anti-oxidants, mold release agents, flame retarding agents, or any combination of colorants to achieve the desired aesthetic look under day light and UV stabilizers. It is also possible to incorporate scattering agents like titanium dioxide in the compositions of the invention.

As long as the compositions remain transparent or translucent it is possible to incorporate in the compositions of the invention other polymers like rubber modified copolymers, graft copolymers and other polymers.

For the purpose of this invention translucent or transparent means compositions suitable for making molded parts with a diffuse light transmission of 20% or higher at a molded part thickness of 0.100 inch (2.54 mm) as measured per Suitable polymers that may be incorporated in the compositions of the invention are for example silicone polycarbonate block copolymers and cycloaliphatic polyester resins.

Suitable silicone polycarbonate block copolymers have from about 0.5% to about 80% by weight of chemically combined polydiorganosiloxane units with an average block length of about 10 to about 100 chemically combined diorganosiloxy units. They can be prepared such as described for example in U.S. Pat No. 5,530,083.

Suitable cycloaliphatic polyester resins are the resins comprising the reaction product of an aliphatic $C_2$–$C_{12}$ diol or chemical equivalent and a $C_6$–$C_{12}$ aliphatic diacid or chemical equivalent, said cycloaliphatic polyester resin containing at least about 80% by weight of a cycloaliphatic dicarboxylic acid, or chemical equivalent, and/or of a cycloaliphatic diol or chemical equivalent.

The preferred polyester molecules are derived from cycloaliphatic diol and cycloaliphatic diacid compounds, specifically polycyclohexane dimethanol cyclohexyl dicarboxylate. The polyester having only one cyclic unit may also be useful. The most preferred polyester has both cycloaliphatic diacid and cycloaliphatic diol components such as polycyclohexane dimethanol cyclohexyl dicarboxylate.

Objects Made out of the Compositions of the Invention.

Objects molded out of the compositions of the invention will exhibit an interesting diffused (translucent) look in the daylight while giving a high contrast between face color and edge color (i.e. edge-glow) at night. Such resin formulations are, for instance, suitable for applications such as business equipment, computers and peripherals, consumer electronics, telecom (cell phones, personal data assistants, wireless devices), in the automotive industry (knobs, dashboards and reflectors), and helmets where the physical properties of polycarbonate are needed and a glow-in-the-dark effect is desired for aesthetic purposes. Another application would be in optical media and especially the non-information side (disk half that is not traversed by the reading laser) of optical disks like DVD-5 and DVD-9.

Processes for Preparation of the Compositions of the Invention.

The compositions of the present invention can be molded by conventional molding processes into objects. The preferred molding processes are by injection molding, by blow molding and by film/sheet extrusion. Most preferred is the molding by injection molding.

The processing of long afterglow phosphorescent pigments in polycarbonate is usually a very complex task. Since the hardness of these pigments is generally very high, extruder screws are "scrubbed" during compounding or even during the injection-molding process. This results in graying of the resin and/or the final part. A solution to this problem is to feed the pigment downstream during the extrusion. Unfortunately, although this decreases the graying issue, it does not eliminate the problem. It has been found that the use of extremely fine pigments with a median particle size of less than 10 micrometer, more preferably with a median particle size below 5.0 micrometer, and a maximum particle size of 10 micrometer is useful for the elimination of the graying issues, which provides a brighter daylight color as well as a brighter and more durable night glow in the final product. In this case, downstream feeding is not even required and even a single screw extruder can compound the complete resin formulation.

Extrusion of the blend can be done on a single or a twin-screw extruder with a preference for a single screw in order to minimize the shear and the contacts between screw and phosphorescent pigments. Side feeding of the raw pigment (upstream or downstream) can be used in order to get a tighter control of the pigment concentration in the formulation. Since polycarbonate and phosphorescent pigments are moisture sensitive, it is preferable to perform a thorough drying before the extrusion. Vacuum can also be used during the extrusion to further eliminate moisture during the compounding operation. Parts, like color chips, are then injection molded according to the corresponding resin datasheet and have a diffused (translucent) look under daylight. An interesting property of the diffused look, especially in terms of design, is the "contact clarity" effect. When in close contact to an object, the diffused color chip will allow to see clearly the object behind it while, past a certain distance (usually several inches), the object appears completely blurred.

EXAMPLES

All Luminova phosphorescent pigments used in the following examples have an aluminate matrix expressed by $MAl_2O_4$ in which M is at least one metal element selected from calcium, strontium and barium.

Example 1

In the formulation described herebelow according to this invention (formulation B) a commercially available long afterglow phosphorescent pigment with a very small particle size has been used i.e. Luminova G300FFS (median particle size of about 1.7 μm and maximum particle size of 6 μm). It has been blended with the polycarbonate resin in order to obtain the desired composition giving molded articles with the desired luminescent properties and the aesthetics under almost complete retention of the mechanical properties of the polycarbonate resin.

A Polycarbonate Resin Composition (A) was Prepared by Mixing:

65 parts of poly(bisphenol-A carbonate) with an average molecular weight ($M_w$) of 29,900

35 parts of poly(bisphenol-A carbonate) with an average molecular weight ($M_w$) of 21,900

0.06 parts of tris(2,4-di-tert-butylphenyl) phosphite 0.27 parts of pentaerythritol tetrastearate A Polycarbonate Resin Composition (B) was Prepared by Mixing:
- 65 parts of poly(bisphenol-A carbonate) with an average molecular weight ($M_w$) of 29,900
- 35 parts of poly(bisphenol-A carbonate) with an average molecular weight ($M_w$) of 21,900
- 0.06 parts of tris(2,4-di-tert-butylphenyl) phosphite
- 0.27 parts of pentaerythritol tetrastearate
- 0.5 parts of Luminova G300OFFS previously dried at 260° C. for 4 hours.

A Polycarbonate Resin Formulation (C) was Prepared by Mixing:
- 65 parts of poly(bisphenol-A carbonate) with an average molecular weight ($M_w$) of 29,900
- 35 parts of poly(bisphenol-A carbonate) with an average molecular weight ($M_w$) of 21,900
- 0.06 parts of tris(2,4-di-tert-butylphenyl) phosphite
- 0.27 parts of pentaerythritol tetrastearate
- 0.5 parts of Luminova G300M (median particle size of about 20 μm with 90% of the particles having a size below 64 μm) previously dried at 260° C. for 4 hours.

The blended mixtures were dried for 5 hours at 120° C. before extrusion. After extrusion at 290° C. using single screw extruder, the batches were pelletized. Test parts and 5×7.5×0.25 cm color chips were injection-molded at 315° C. The molded parts made of formulation (B) exhibited a greenish color under daylight with a diffused look. Formulation (A) was a clear transparent material. Formulation (C) was almost transparent with some sparkles but did not exhibit a diffused look as formulation (B). Color chips corresponding to formulation (B) were exposed for 30 minutes to a D65 Illuminant in a MacBeth Spectra II light booth. The glow performances, expressed by the luminance, were measured using a Minolta LS-100 luminance meter in a custom fixture insulating the chip from the outside light. Ten minutes after being placed in the dark, the color chip still showed a luminance of 4 mCd/m2. After an hour, the luminance was still 1 mCd/m2 which is still more than 300 times the visibility threshold of the human eye in the dark.

The physical properties of the formulations (A) and (B) were measured according to ASTM methods and are reported in Table I. It is noteworthy that the phosphorescent pigments with a small particle size (B), did not negatively affect the properties of regular polycarbonate (A).

Example 2

In the formulation described herebelow according to this invention (formulation E) a commercially available long afterglow phosphorescent pigment with a very small particle size has been used i.e. Luminova G300FFS (median particle size of about 1.7 μm and maximum particle size of 6 μm). It has been blended with the polycarbonate resin in order to obtain the desired composition giving molded articles with the desired luminescent properties and the aesthetics under almost complete retention of the mechanical properties of the polycarbonate resin.

A Polycarbonate Resin Composition (D) was Prepared by Mixing:
- 100 parts of poly(bisphenol-A carbonate) with an average molecular weight ($M_w$) of 21,900
- 0.06 parts of tris(2,4-di-tert-butylphenyl) phosphite
- 0.27 parts of pentaerythritol tetrastearate A polycarbonate resin composition (E) was prepared by mixing:
- 100 parts of poly(bisphenol-A carbonate) with an average molecular weight ($M_w$) of 21,900
- 0.06 parts of tris(2,4-di-tert-butylphenyl) phosphite
- 0.27 parts of pentaerythritol tetrastearate
- 0.5 parts of Luminova G300FFS previously dried at 260° C. for 4 hours.

A Polycarbonate Resin Formulation (F) was Prepared by Mixing:
- 100 parts of poly(bisphenol-A carbonate) with an average molecular weight ($M_w$) of 21,900
- 0.06 parts of tris(2,4-di-tert-butylphenyl) phosphite
- 0.27 parts of pentaerythritol tetrastearate
- 0.5 parts of Luminova G300M (particle size above 10 microns) previously dried at 260° C. for 4 hours.

The phosphorescent pigments in formulations (E) and (F) were added using a side downstream feeder on a single-screw extruder in order to minimize the contact between the phosphorescent pigment and the screw. Extrusion was performed at 290° C. and the final material was pelletized. Test parts and 5×7.5×0.25 cm color chips were injection-molded at 300° C. The molded parts made of formulation (E) exhibited a greenish color under daylight with a diffused look. Formulation (E) was a clear transparent material. Formulation (F) was almost transparent with some sparkles but did not exhibit a diffused look as formulation (E).

TABLE I

| Property | Units | Method | (A) | (B) |
| --- | --- | --- | --- | --- |
| Tensile Strength, Type I, yield, 0.125" (3.2 mm) | psi (MPa) | ASTM D 638 | 8 900 (62) | 8 900 (62) |
| Tensile Strength, Type I, break, 0.125" (3.2 mm) | psi (MPa) | ASTM D 638 | 10 400 (71) | 9 300 (64) |
| Tensile Elongation, Type I, yield, 0.125" (3.2 mm) | % | ASTM D 636 | 6.4 | 6.4 |
| Tensile Elongation, Type I, break, 0.125" (3.2 mm) | % | ASTM D 638 | 130 | 120 |
| Flexural Strength, 0.125" (3.2 mm) | psi (MPa) | ASTM D 790 | 14 500 (100) | 14 500 (100) |
| Flexural Modulus, 0.125" (3.2 mm) | psi (MPa) | ASTM D 790 | 332 000 (2275) | 335 000 (2295) |
| Izod Impact, notched, 0.125" (3.2 mm), 23° C. | ft-lb/in (J/m) | ASTM D 256 | 18 (960) | 18 (960) |
| Izod Impact, notched, 0.125" (3.2 mm), 23° C. | % ductility | ASTM D 256 | 100% | 100% |
| Instrumented Impact Energy @ peak, 23° C. | ft-lbs (J) | ASTM D 3763 | 50.4 (68) | 47.9 (65) |
| Melt Flow Rate, 300° C., 1.2 kgf | g/10 min | ASTM D 1238 | 10.1 | 12.9 |
| HDT, 66 psi, 0.250" (6.4 mm) unannealed | ° C. | ASTM D 648 | 140.2 | 139.7 |
| HDT, 264 psi, 0.250" (6.4 mm) unannealed | ° C. | ASTM D 648 | 129.2 | 128.9 |
| Diffuse light transmission @ 2.54 mm | % | ASTM D1003 | Not measured | 89 |

The physical properties of the formulations (D), (E) and (F) were measured according to ASTM methods and are reported in Table II. It is well known to those skilled in the art that the negative effect of pigments on physical properties corresponds to a loss of ductility that is especially seen in Notched Izod Impact testing results. Table II clearly shows that the phosphorescent pigments with a small particle size (E) have very little effect on the physical properties whereas the large particle size (F) induces a loss of ductility and impact resistance.

TABLE II

| Property | Units | Method | (D) | (E) | (F) |
| --- | --- | --- | --- | --- | --- |
| Tensile Elongation, Type I, break, 0.125" (3.2 mm) | % | ASTM D 638 | 120 | 110 | 100 |
| Izod Impact, notched, 0.125" (3.2 mm), 23° C. | ft-lb/in (J/m) | ASTM D 256 | 12 (640) | 12 (640) | 3 (160) |
| Izod Impact, notched, 0.125" (3.2 mm), 23° C. | % ductility | ASTM D 256 | 100% | 100% | 0% |
| Instrumented Impact Energy @ peak, 23° C. | ft-lbs (J) | ASTM D 3763 | 40.2 (54) | 43.6 (59) | 37.8 (51) |
| Melt Flow Rate, 300° C., 1.2 kgf | g/10 min | ASTM D 1238 | 28.7 | 30.8 | 36.5 |
| HDT, 264 psi, 0.250" (5.4 mm) unannealed | ° C. | ASTM D 648 | 127.9 | 127.2 | 125.7 |
| Diffuse light transmission @ 2.54 mm | % | ASTM D1003 | n.m.** | 68 | n.m.** |

*% Ductility means the percentage of the number of bars that were not completely broken (out of a series of five bars).
**n.m. = not measured Example 3

In the formulation described herebelow according to this invention (formulation G) a commercially available long afterglow phosphorescent pigment with a very small particle size has been used i.e. Luminova GLL300FFS (median particle size of about 1.7 $\mu$m and maximum particle size of 6 $\mu$m). This special phosphor is known as being efficiently activated even under indoor lighting conditions such as fluorescent light, or low lighting conditions (i.e. 25 lux). It has been blended with the polycarbonate resin and several plastic colorants in order to obtain the desired composition giving molded articles with the desired luminescent properties and the aesthetics under almost complete retention of the mechanical properties of the polycarbonate resin.

A Polycarbonate Resin Formulation (G) was Prepared by Mixing;

- 35 parts of poly(bisphenol-A carbonate) with an average molecular weight ($M_w$) of 29,900
- 65 parts of poly(bisphenol-A carbonate) with an average molecular weight ($M_w$) of 21,900
- 0.05 parts of diphenyl isodecyl phosphite
- 0.27 parts of pentaerythritol tetrastearate
- 0.011 parts of Titanium Dioxide (GE01 from Dupont)
- 0.0001 parts of Solvent Red 135
- 0.001 parts of VAT Red 41
- 0.9 parts of Luminova GLL300FFS previously dried at 260° C. for 4 hours.

Extrusion of resin formulation (G) was performed at 290° C. in a single screw extruder and the final material was pelletized. Test parts and color chips (5×7.5×0.25 cm) were injection-molded at 315° C. The molded parts made of formulation (G) exhibited a bright light red (pink) color under daylight with a highly diffused look. After exposure to a cool white fluorescent light (illuminant CWF2) for 5 minutes in a Macbeth Spectralight II light booth, the chips exhibited a bright green light emission (phosphorescence) when placed in complete darkness. The glow performances, expressed by the luminance, were measured using a Minolta LS-100 luminance meter in a custom fixture insulating the chip from the outside light. After an hour, the luminance was still 2 mCd/m2 which is still more than 600 times the visibility threshold of the human eye in the dark. As in the previous examples, physical testing confirmed the almost complete retention of the physical properties of the polycarbonate resin. The diffuse light transmission was 50% (ASTM D1003 at 2.54 mm).

What is claimed is:

1. Transparent or translucent thermoplastic composition comprising a thermoplastic polycarbonate resin and a phosphorescent phosphor with a aluminate matrix expressed by $MAl_2O_4$ in which M is at least one metal element selected from calcium, strontium and barium, wherein the phosphor is present in a quantity of 0.01 to 2.0% by weight with respect to the quantity of polycarbonate resin and possesses a median particle size of less than 10 micrometer.

2. Transparent or translucent thermoplastic composition of claim 1 further comprising one or more other polymers.

3. Transparent or translucent thermoplastic composition according to claim 1 wherein the phosphor has a median particle size below 5.0 micrometer and a maximum particle diameter of 10 micrometer.

4. Transparent or translucent thermoplastic composition according to claim 1 wherein the aluminate has been doped with Europium.

5. Transparent or translucent thermoplastic composition according to claim 1 wherein the aluminate has been doped with Europium and at least one co-dopant.

6. Transparent or translucent thermoplastic composition according to claim 1 comprising a scattering agent.

7. Transparent or translucent thermoplastic composition according to claim 1 wherein colorants have been added to provide daylight color.

8. Process for forming objects from the transparent or translucent thermoplastic compositions of any one of the preceding claims by injection molding.

9. Objects formed by injection molding of the transparent or translucent thermoplastic composition of any one of claims 1–7.

* * * * *